(12) United States Patent
Trenkle et al.

(10) Patent No.: US 9,095,761 B2
(45) Date of Patent: Aug. 4, 2015

(54) GOLF SYSTEM USER INTERFACE

(75) Inventors: Bradley C. Trenkle, Prairie Village, KS (US); Daniel P. Rausch, Overland Park, KS (US); Adam P. Cloud, Olathe, KS (US); Thomas I. Loschen, Overland Park, KS (US)

(73) Assignee: Garmin Switzerland GmbH (CH)

( * ) Notice: Subject to any disclaimer, the term of this patent is extended or adjusted under 35 U.S.C. 154(b) by 1595 days.

(21) Appl. No.: 12/539,990

(22) Filed: Aug. 12, 2009

(65) Prior Publication Data
US 2010/0174480 A1 Jul. 8, 2010

Related U.S. Application Data

(60) Provisional application No. 61/142,437, filed on Jan. 5, 2009.

(51) Int. Cl.
*G01C 21/00* (2006.01)
*A63B 71/06* (2006.01)
(Continued)

(52) U.S. Cl.
CPC ............ *A63B 71/0619* (2013.01); *G01C 21/20* (2013.01); *A63B 71/0622* (2013.01); *A63B 2024/0037* (2013.01); *A63B 2069/3605* (2013.01); *A63B 2071/063* (2013.01); *A63B 2071/0691* (2013.01); *A63B 2220/12* (2013.01); *A63B 2220/13* (2013.01); *A63B 2220/14* (2013.01); *A63B 2220/20* (2013.01); *A63B 2225/50* (2013.01); *A63B 2243/0029* (2013.01)

(58) Field of Classification Search
CPC .............. A63B 2071/0691; A63B 2071/0694; A63B 2243/0029; A63B 2220/10; A63B 2220/12; A63B 2220/13; A63B 2220/14; A63B 2220/16; A63B 2220/05; G01S 19/19; G01S 19/41; G01S 19/51; G01S 5/30
USPC ......... 701/201, 409, 412, 454, 461, 468, 482, 701/489, 491, 516, 519, 526, 532
See application file for complete search history.

(56) References Cited

U.S. PATENT DOCUMENTS 5,044,634 A   9/1991 Dudley ........................... 273/32
5,364,093 A  11/1994 Huston et al. ................... 273/32
(Continued)

FOREIGN PATENT DOCUMENTS

JP    2000-511460    9/2000
JP    2005-253858    9/2005
KR    10-0815398     3/2008

OTHER PUBLICATIONS

OnPar User Manual, pp. 8-9, published 2009.
(Continued)

*Primary Examiner* — John Q Nguyen
*Assistant Examiner* — Kyung Kim
(74) *Attorney, Agent, or Firm* — Samuel M. Korte; Mohammad M. Ali

(57) ABSTRACT

Techniques are described to furnish location-based functionality to golf-related electronic devices. In one or more embodiments, the distances associated with features of a hole of a golf course such as sand traps, water hazards and other hazards, trees, tree lines, waste areas, out of bounds areas, man-made hazards, and so on may be selectively labeled based on the relative positions of the device, the features, and a point within the hole of the golf course such as the pin or other point within the green.

39 Claims, 15 Drawing Sheets

(51) Int. Cl.
*G01C 21/20* (2006.01)
*A63B 24/00* (2006.01)
*A63B 69/36* (2006.01)

(56) References Cited

U.S. PATENT DOCUMENTS

| | | | |
|---|---|---|---|
| 5,434,789 A | 7/1995 | Fraker et al. | 364/460 |
| 5,438,518 A | 8/1995 | Bianco et al. | 364/460 |
| 5,507,485 A | 4/1996 | Fisher | 273/32 |
| 5,525,690 A | 6/1996 | Chien et al. | 526/160 |
| 5,685,786 A | 11/1997 | Dudley | 473/407 |
| 5,878,369 A | 3/1999 | Rudow et al. | 701/215 |
| 6,236,940 B1 | 5/2001 | Rudow et al. | 701/300 |
| 6,263,279 B1 | 7/2001 | Bianco et al. | 701/213 |
| 6,278,402 B1 | 8/2001 | Pippin | 342/357.08 |
| 6,456,938 B1 * | 9/2002 | Barnard | 701/454 |
| 6,470,242 B1 | 10/2002 | Rudow et al. | 701/1 |
| 6,496,141 B2 | 12/2002 | Pippin | 342/357.08 |
| 7,118,498 B2 | 10/2006 | Meadows et al. | 473/407 |
| 2002/0138196 A1 * | 9/2002 | Polidi et al. | 701/208 |

OTHER PUBLICATIONS

SG5 SkyCaddie User Guide, pp. 41-44, published 2008.
Callaway uPro™ Golf GPS User Guide v1,4, pp. 32-33, published prior to Jan. 5, 2009.
International Search Report from corresponding International Application No. PCT/US2009/069900, dated Dec. 31, 2009.

* cited by examiner

GOLF SYSTEM USER INTERFACE

CROSS-REFERENCE TO RELATED APPLICATIONS

The present application claims the benefit under 35 U.S.C. §119(e) of U.S. Provisional Application Ser. No. 61/142,437, filed Jan. 5, 2009, which is herein incorporated by reference in its entirety.

BACKGROUND

Golf is a popular sport in which players use a variety of clubs including woods, irons, wedges, and a putter to attempt to hit a golf ball into each hole on a golf course in the lowest possible number of strokes. Typically, golfers use woods (e.g., driver, 3 wood, 5 wood, etc.) for long-distance fairway shots; irons (e.g., 3 iron, 5 iron, 7 iron, 9 iron, etc.) for intermediate and short range shots, wedges (e.g., pitching wedge, sand wedge, etc.) for short range shots or shots made out of sand traps; and the putter to put the ball into the hole on the green. Each club (e.g., driver, 3 iron, 9 iron, wedge, etc.) may be designed to hit the golf ball a different distance (with higher numbered clubs hitting the ball a shorter distance). Thus, the golfer may select an appropriate club depending on the golfer's distance from the hole.

Golf does not use a standardized playing area. Rather, each golf course has a unique design, which typically consists of either 9 or 18 holes. Typically, each fairway of a golf course is provided with periodically spaced markers that indicate the distance to the green. However, the golfer may at times fail to hit the golf ball consistently, causing the ball to land outside of the fairway (e.g., in the rough). While playing, it may be difficult for the golfer to estimate the distance the ball is to be hit from the nearest marker, and to select an appropriate golf club.

SUMMARY

Techniques are described to furnish location-based functionality to golf-related electronic devices. In one or more embodiments, the distances associated with features of a hole of a golf course such as sand traps, water hazards, out of bounds areas, trees, tree lines, waste areas, cart paths and other man made obstacles, and so on, may be selectively labeled based on the relative positions of the golfer (e.g., the device), the feature, and a point within the hole of the golf course such as the pin, other point within the green or fairway, and so on. For example, in some embodiments, the distance between the current position of the device and a feature of a hole of a golf course may be displayed when the feature is located within a lateral range of a vector extending from the current position of the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
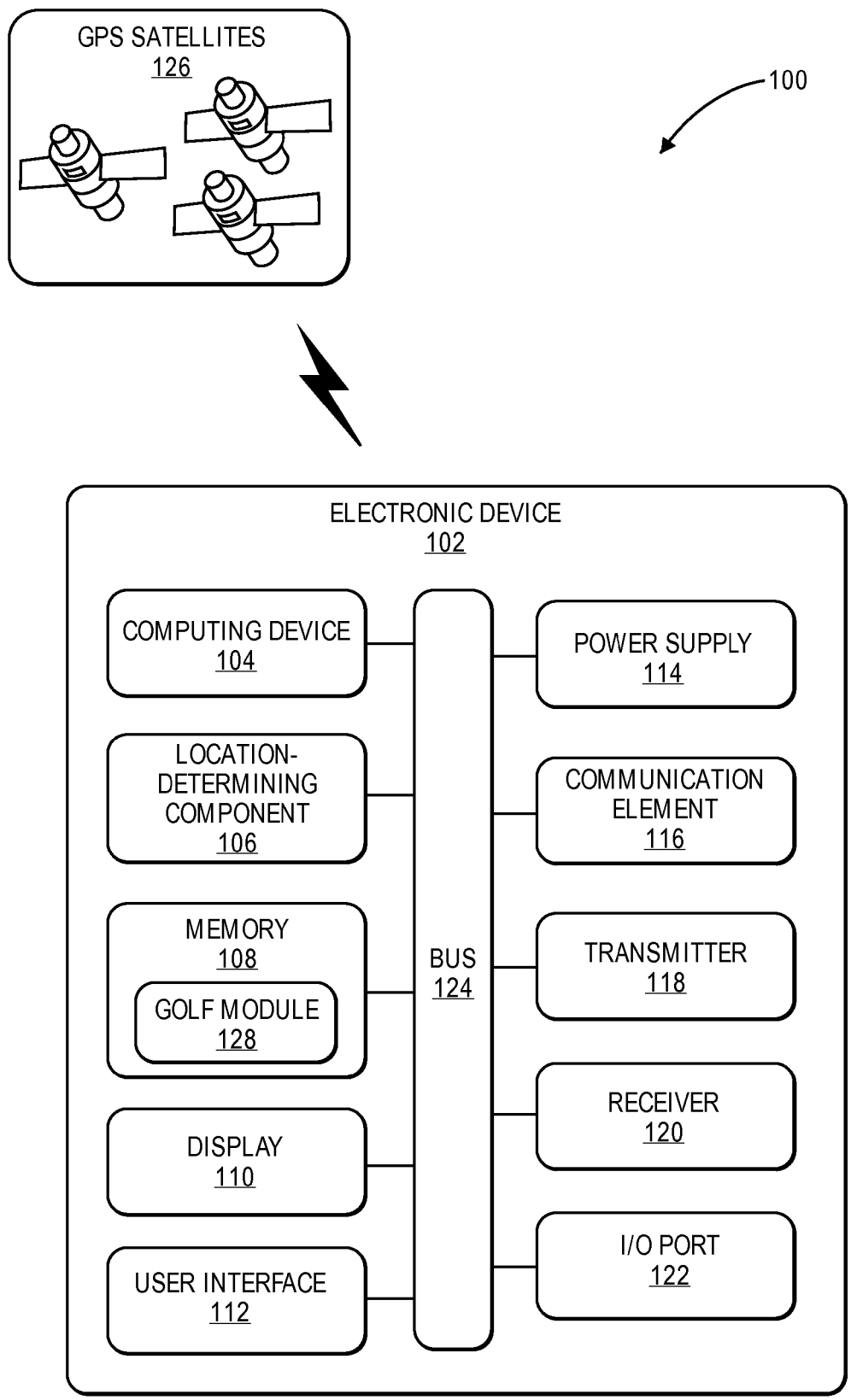
FIG. 1 is an illustration of an environment in an example implementation that employs a golf-related electronic device that is operable to furnish location-based functionality to a golfer.

When making a shot in a game of golf, a golfer first selects an area of the hole being played where he or she wishes the shot to land and then attempts to select the proper club (e.g., driver, 3 iron, 9 iron, wedge, etc.) to hit the golf ball to the selected area. For example, the golfer may select a wood or a lower numbered iron to hit the ball a greater distance, such as, for example, along a long fairway. Conversely, the golfer may select a higher numbered iron (e.g., a 9-iron) or a wedge to hit the ball a shorter distance, such as, for example, on an approach shot. Consequently, to achieve a lower score, it is desirable that the golfer be able to accurately ascertain the area he or she wishes the shot to land and the distance to that area in so that the golfer may select an appropriate club.

Most golf courses provide markers that are periodically spaced along the fairway of each hole to indicate an approximate distance to the green. These markers allow the golfer to roughly estimate his or her location and the distance of the shot being attempted. However, golfers frequently misjudge their locations, especially on unfamiliar golf courses. For example, the golfer may at times be forced to hit the ball from a lie outside of the fairway (e.g., in the rough). In such cases, it may be difficult for the golfer to estimate the distance the ball is to be hit from the nearest marker and to select the appropriate golf club.

Golf-related electronic devices may be configured to aid golfers in determining the golfer's location on a hole of a golf course, and in more accurately estimating the distance to the green of the hole. For example, golf-related electronic devices may employ a location determining component such as a Global Positioning System (GPS) receiver to determine the golfer's location. Such devices may also furnish the golfer with a map of the holes on the golf course being played.

Golf-related electronic devices thus aid the golfer in making more accurate club selections, and may help the golfer reduce his or her score.

Techniques are described to furnish enhanced location-based functionality to golf-related electronic devices including hand-held devices, golf cart-mounted devices, and so on. In one or more embodiments, the techniques described provide functionality to display the layout of a hole of a golf course in a "hole-up" manner. In such embodiments, the layout of the hole is displayed such that indicia representing the pin are displayed towards the top of the display and indicia representing the position of the golfer are displayed towards the bottom of the display. As the golfer moves about the golf hole, the displayed positions of features of the hole are reoriented within the display with respect to the position of the golfer, while the positions of the indicia representing pin and the golfer remain stationary.

Techniques are also described to furnish target distance functionality. The electronic device may display a target icon on a layout of a hole of a golf course that may be manipulated by the golfer to calculate additional distances. As the target icon is moved about the layout, the device may present various yardages corresponding to the geographical location associated with the target icon. For example, the device may present both the distance from a current location of the golfer to the target icon and the distance from the target icon to the pin of the golf hole.

Techniques are further described that provide functionality to selectively label distances associated with features of a hole of a golf course such as sand traps, water hazards, out of bounds areas, trees, tree lines, waste areas, cart paths and other man made obstacles, and so on, based on the relative positions of the golfer, the features, and a point within the hole. For example, the distance between the current position of the electronic device and a feature of the golf hole may be displayed when the feature is located within a lateral range of a vector extending from the current position of the device.

Still further, techniques are described that provide functionality to implement an interface that allows the golfer to graphically position a virtual pin marker on a displayed green. The golfer may change the position of the virtual pin marker to cause a distance to be calculated for any position of the marker on the green. Once the golfer has set the virtual pin marker to a desired location, the relevant distances displayed on the layout of the golf hole are updated to reflect distances to the virtual pin location input by the golfer.

In the following discussion, an example environment comprising a golf-related electronic device is first described. Example functionality is then described that may be implemented by the electronic device in the exemplary environment, as well as in other environments without departing from the spirit and scope thereof.

Example Environment

FIG. 1 illustrates an example environment 100 that employs electronic device 102 which is configured to furnish location-based functionality to a golfer. The electronic device 102 may be any electronic device that is operable to receive, utilize, or determine geographic information, such as a current geographic location. In certain embodiments, the device 102 may be a portable and/or handheld device such as the handheld electronic device 200 illustrated in FIG. 2. Example portable and/or handheld electronic devices are distributed by GARMIN INTERNATIONAL, INC. of Olathe, Kans. However, the device 102 may be any electronic device configured as described herein or otherwise operable to perform the functions described below. For example, in some embodiments, the device 102 may comprise one or more components of a golf cart-mounted system or a multi-purpose electronic device, such as a mobile phone, mobile internet device, portable entertainment unit, combinations thereof, and the like.

As illustrated in FIG. 1, the electronic device 102 includes a computing device 104, a location-determining component 106, a memory 108, a display 110, a user interface 112, and a power source 114. The device 102 may further include a communication element 116, a transmitter 118, a receiver 120, and one or more input/output (I/O) ports 122. In one or more embodiments, the various components 104-122 of the device 102 are contained within a portable, hand-held housing such as the housing 202 of the handheld electronic device 200 illustrated in FIG. 2. In other embodiments, the various components 104-122 of the device 102 may be contained within one or more housings that are part of a golf cart mounted system, such as a panel disposed within a golf cart.

The computing device 104 is configured to provide computing and/or processing functionality to the device 102. The computing device 104 may include any number of processors, controllers, integrated circuits, programmable logic devices, or other processing systems and resident or external memory for storing data and other information accessed and/or generated by the electronic device 102. The computing device 104 may be coupled with other components of the electronic device 102 such the location-determining component 106, memory 108, display 110, and user interface 112 through wired or wireless connections, such as a bus (e.g., data bus) 124, to enable information to be exchanged between the various components.

The computing device 104 may execute one or more software (computer) programs that perform some or all of the functions and techniques described herein. In example embodiments, the software program comprises an ordered listing of executable instructions for implementing logical functions in the computing device. The software program can be embodied in any computer-readable medium for use by or in connection with an instruction execution system, apparatus, or device. In the context of this disclosure, a "computer-readable medium" can be any tangible medium that can contain, store, communicate, propagate or transport the software programs for use by or in connection with the computing device 104.

The location-determining component 106 is configured to provide location determining functionality to the electronic device 102. In various embodiments, the location-determining component 106 may be a satellite navigation system receiver, such as a global positioning system (GPS) receiver, a GLONASS receiver, and/or a GALILEO receiver, that provides geographic location information.

The location-determining component 106 may include one or more processors, controllers, or other computing resources and memory so that it may calculate location and other geographic information without the computing device 104 or it may utilize the components of the computing device 104. Further, the location-determining component 106 may be integral with the computing device 104 such that the location-determining component 106 may be operable to specifically perform the various functions and techniques described herein. Thus, the computing device 104 and location-determining component 106 can be combined or be separate or otherwise discrete structures.

In various embodiments, the location-determining component 106 is operable to receive navigational signals from satellites 126 and to calculate the position of the device 102 as a function of the signals. The location-determining component 106 in conjunction with the computing device 104 may, for example, determine a track log or any other series of geographic coordinates that correspond to points along a path traveled by the golfer who implements the device 102. The location-determining component 106 and/or the computing device 104 may also be operable to calculate a route to a desired location, provide instructions to navigate to the desired location, display maps and other information on the display 110, and to execute other functions described herein.

Although GPS-enabled devices are often used to describe navigational devices, any receiver suitable for use with other global navigation satellite systems (GNSS) may be used instead of or in addition to the GPS receiver. It will also be appreciated that satellites 126 need not be used to determine a geographic position of the location-determining component 106 since any receiving device capable of receiving the location from at least three transmitting locations can perform triangulation calculations to determine the relative position of the location-determining component 106 with respect to the transmitting locations. For example, cellular towers or any customized transmitting radio frequency towers can be used instead of the satellites 126. With such a configuration, any geometric triangulation algorithm can be used to determine the location of the device 102.

In other embodiments, the location-determining component 106 need not directly determine the current geographic location of the device 102. For instance, the location-determining component 106 may determine the current geographic location by receiving location information input by the golfer, through a communications network, or from another device.

The location-determining component 106 may include an antenna to assist in receiving the satellite signals. The antenna may be a patch antenna, a linear antenna, or any other type of antenna that can be used to receive signals used to aid in navigation. The antenna may be mounted directly on or in the housing of the device 102 (e.g., within the housing 202 of the hand-held electronic device 200 illustrated in FIG. 2), or may be mounted external to the housing.

The memory 108 is an example of tangible computer-readable media that provides storage functionality to store data associated with the operation of the device 102, such as the software program and code segments mentioned above, or other data to instruct the computing device 104 and other structures of the device 102 to perform the techniques described herein. Although a single memory 108 is shown, a wide variety of types and combinations of memory may be employed. The memory 108 may be integral with the computing device 104, integral with the location-determining component 106, stand-alone memory, or a combination of the foregoing. The memory 108 may include, for example, removable and non-removable memory elements such as RAM (Random Access Memory), ROM (Read Only Memory), Flash (e.g., SD (Secure Digital) Card, mini-SD card, micro-SD Card), magnetic, optical, USB (Universal Serial Bus) memory devices, and so forth. In embodiments of the device 102, the memory 108 may include removable ICC (Integrated Circuit Card) memory such as provided by SIM (Subscriber Identity Module) cards, USIM (Universal Subscriber Identity Module) cards, UICC (Universal Integrated Circuit Cards), Secure Digital (SD) cards, Compact Flash (CF) cards, and so on.

The memory 108 may store various cartographic data corresponding to geographic locations including map data, and map elements, such as golf course data and layouts, and so on. In various embodiments, the golf map data stored within the memory 108 is vectorized to enable any portion of a golf hole to be displayed by the device 102 with accurate yardages, as is discussed in more detail below. Use of vectorized map data enables the device 108 to provide distance information to any point on the golf hole without relying on a limited or finite number of pre-defined positions on the golf hole layout to calculate pertinent distances.

In some embodiments, the electronic device 102 may provide navigation functionality in addition to golf-related functionality. In such embodiments, the memory 108 may store additional cartographic data corresponding to geographic locations such as thoroughfares, terrain, alert locations, points of interest, geographic entities, radio stations, and other navigation data to facilitate the various navigation functions provided by the device 102. Additionally, the memory 108 may store destination addresses and previously calculated or otherwise acquired routes to various destination addresses for later retrieval by the computing device 104.

The memory 108 or some other memory accessible by the computing device 104 may store a database of golf information, including prior scores and shot information, yardage information, local course information, aerial and satellite imagery, famous player information, combinations thereof, and so on.

The various data stored within the memory 108 may be associated within one or more databases to facilitate retrieval of the information. For example, the databases may be configured to enable the computing device 104 to automatically access a database of known golf course information (e.g., hole layout, yardages, best scores, and so on) based upon a current geographic location of the device 102 as discussed in more detail herein below.

The display 110 provides display functionality to the device 102. In embodiments, the display 110 is operable to display various prompts to the golfer as is described herein below. The display 110 may comprise color display elements (or alternatively, black and white or monochrome display elements) including, but not limited to, LCD (Liquid Crystal Diode), TFT (Thin Film Transistor) LCD, LEP (Light Emitting Polymer) or PLED (Polymer Light Emitting Diode), and/or plasma display devices. The display 110 may be of sufficient size to enable the golfer to easily view the display 110 to receive presented information.

Figure 2:
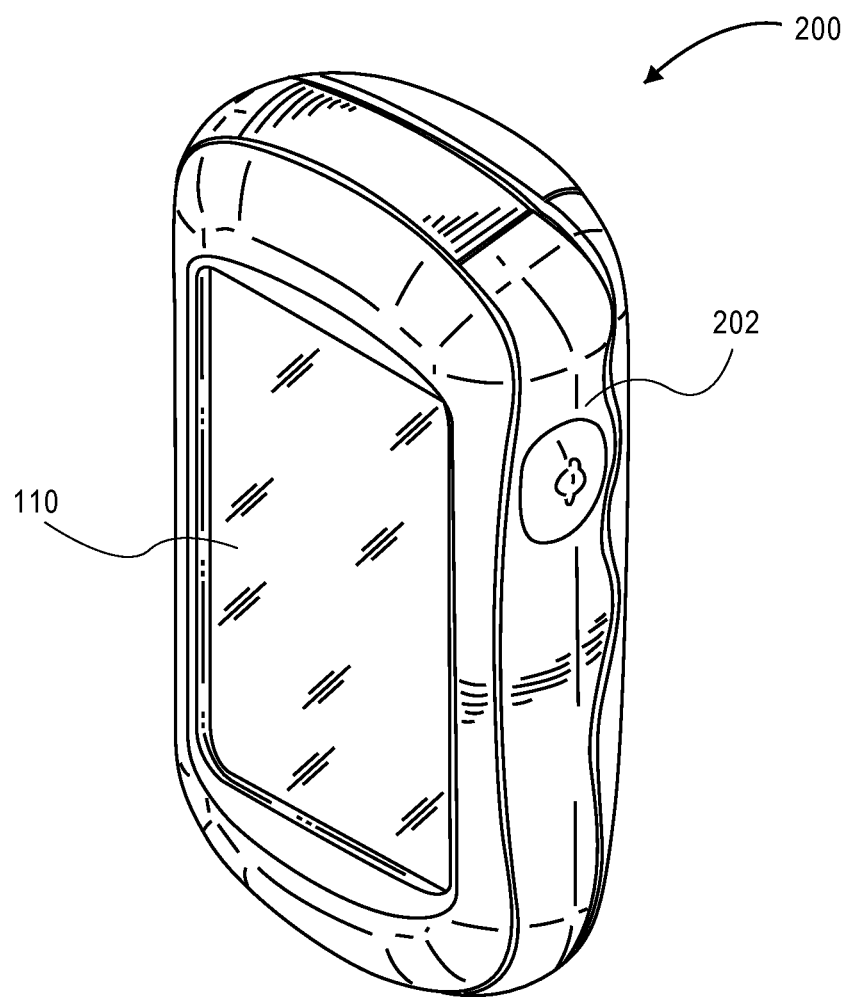
FIG. 2 is an isometric view depicting an example hand-held golf-related electronic device suitable for use in the environment shown in FIG. 1.

The display 110 is generally associated with the housing of the device 102 (e.g., the display 110 may be mounted within the housing 202 of the hand-held electronic device 200 illustrated in FIG. 2). However, the display 110 need not be physically coupled with the housing of the device 102. Further, as described above, the display 110 may be integrated with the user interface 112, such as in embodiments where the display 110 is a touch-screen display to enable the golfer to interact with the display 110 by touching or pointing at display areas to input information to the device 102.

The user interface 112 provides functionality that permits a golfer to operate the device 102 and enables golfers, third parties, or other devices to share information with the device 102. The user interface 112 is generally associated with the housing of the device 102, such as by physical connection through wires, and so forth, or wirelessly utilizing conventional wireless protocols. Thus, the user interface 112 need not be physically coupled with the housing of the device 102.

The user interface 112 may comprise one or more user-operable inputs such as buttons, switches, scroll wheels, a touch screen associated with the display 110, voice recognition elements such as a microphone, pointing devices such as a mouse, a touchpad, a trackball, a stylus, a camera such as a digital or film still or video camera, combinations thereof, and so on. Further, the user interface 112 may comprise wired or wireless data transfer elements such as removable memory including the memory 108, data transceivers, and so on, to enable the golfer and other devices or parties to remotely interface with the device 102. The user interface 112 may also comprise a speaker for providing audible instructions and feedback.

The user interface 112 may be operable to provide a variety of information to the golfer utilizing the display 110 or other visual or audio elements such as a speaker. Thus, the user interface 112 enables the golfer and electronic device 102 to exchange information relating to the device 102, such as golf course information, geographic entities, configuration, security information, preferences, route information, points of interests, alerts and alert notification, navigation information, waypoints, a destination address, and so on. The user interface 112 may also enable the golfer to accept or reject a change of a setting by pressing a button, a key, or a touch screen.

The communication element 116 provides communication functionality that enables the device 102 to communicate with other electronic devices or other network enabled devices through a communications network, such as the Internet, a local area network, a wide area network, an ad hoc or peer to peer network, or a direct connection such as a Universal Serial Bus (USB), FIREWIRE (Apple, Inc., Cupertino, Calif.), or BLUETOOTH (Bluetooth SIG, Inc., Bellevue Wash.) connection, and so on. Similarly, the device 102 may be configured to allow direct communication between similarly configured devices that are navigation enabled, such that the device 102 need not necessarily utilize the communications network to share geographic location information.

In various embodiments, the communication element 116 may enable the device 102 to wirelessly communicate with a communication network utilizing wireless data transfer protocols such as WiFi (IEEE 802.11), WIMAX (WiMAX Forum Corporation, Mountain View, Calif.) (IEEE 802.16), BLUETOOTH, ultra-wideband, infrared, mobile telephony, radio frequency, and so on. However, the communication element 116 may couple with a communication network utilizing wired connections, such as an Ethernet cable, and is not limited to wireless communication.

In certain embodiments, the communication element 116 may employ the transmitter 118, the receiver 120, a mobile transceiver, and so on, for transmitting and receiving mobile phone calls over a mobile telephone network. The communication element 116 may include components normally associated with a mobile phone, such as a sound-producing element, like a speaker, transducer, or headset, and a vibration-producing component such as a motor coupled to an eccentric load. Further, the communication element 116 may include features and settings normally associated with a mobile phone, such as, but not limited to, a security lock mode, a personal data lock mode, ring tone, ringer volume, a vibration mode, an enable WiFi mode, an enable BLUETOOTH mode, a mode for automatically sending calls to voice mail, a mode for automatically forwarding calls, a roaming mode, an airplane do not disturb mode, and a golf do not disturb mode (e.g., so the ringer and/or vibration producing component are inhibited and no notification an incoming communication is provided when the device 102 is adjacent a tee box or a green of a golf course).

As illustrated in FIG. 1, the electronic device 102 may include a golf module 128, which may be implemented as a software application stored in memory 108 and executed by the computing device 104. The golf module 128 may provide golf-related functionality to the electronic device 102 as described herein. In one or more embodiments, the golf module may employ a search engine, which may be a software program, firmware, and so on, stored in memory 108 and/or executed by the computing device 104, to search through the database of cartographic information to find known golf courses and holes of the golf course that correspond to the current position of the device 102. The search engine, or alternatively a separate computation engine (which may also be software, firmware, and so on, stored in memory 108 and/or executed by the computing device 104), may also perform calculations related to the cartographic information. The search engine may also identify map locations, such as a golf course or holes of the golf course, that are associated with one or more geographical coordinates such as the current geographic location of the device 102.

Techniques are now described to furnish location-based functionality to golf-related electronic devices such as the electronic device 102 illustrated in FIG. 1. Consequently, in portions of the following discussion, reference will be made to the environment 100 of FIG. 1. However, the features of the techniques described below are platform-independent, meaning that the techniques may be implemented on a variety of devices.

Hole-Up Functionality

With reference to FIGS. 3A through 3F, techniques are described that provide functionality to display the layout of a hole of a golf course in a "hole-up" orientation. By displaying the golf hole in this manner, the electronic device 102 enables the golfer to intuitively determine his or her orientation with respect to the pin of the golf hole regardless of the location of the golfer on the hole. For example, the electronic device 102 may be configured to display the layout of a golf hole corresponding to a current geographic location of the golfer. In one or more embodiments, the device 102 may automatically identify the hole being played by the golfer based on the location of the device 102 determined by the location-determining component 106. In other embodiments, the golfer may input a selection of the golf hole using the user interface 112.

The layout of the golf hole is then displayed such that indicia representing the pin (and/or the green) are presented towards the top of the display 110 and indicia representing the position of the golfer (as determined by the device 102) are presented towards the bottom of the display 110. As the golfer moves about the golf hole (with the device 102), the positions of the pin and the golfer remain generally fixed in the layout, while the positions of other features of the golf hole are reoriented within the display 110 in relation to the positions of the pin and the golfer. In presenting the layout, the device 102 may identify on the display 110 various yardages and other golf-related information. Such functionality enables the golfer to easily identify yardage information without mentally transposing the displayed layout to match his or her physical surroundings.

FIGS. 3A through 3F illustrate the hole layout 300 as the golfer progresses along the golf hole. As shown, the layout 300 is comprised of a map that includes indicia representing the various features of the golf hole such as the tee box 302, the fairway 304, obstacles 306 (e.g., sand traps, water hazards and other hazards, out of bounds areas, trees, tree lines, waste areas, cart paths and other man-made hazards, and so on), the green 308, the pin 310, and so forth. The green 308 is generally centered at the top of the layout 300 (e.g., at the top of the display 110 of the device 102). The pin 310, represented as a flag icon associated with the green 308, is also generally centered at the top of the layout 300 within the green 308. The position of the golfer 312 (represented as a golf ball icon), which may correspond to the location of the device 102, is presented near the bottom of the layout 300. Information relevant to the golfer such as the identity (hole number) of the golf hole 314, the distance 316 to the pin (or green) from the golfer's current position, distances to features of the golf hole 318, and so on may also be displayed within the layout 300.

Figure 3A:
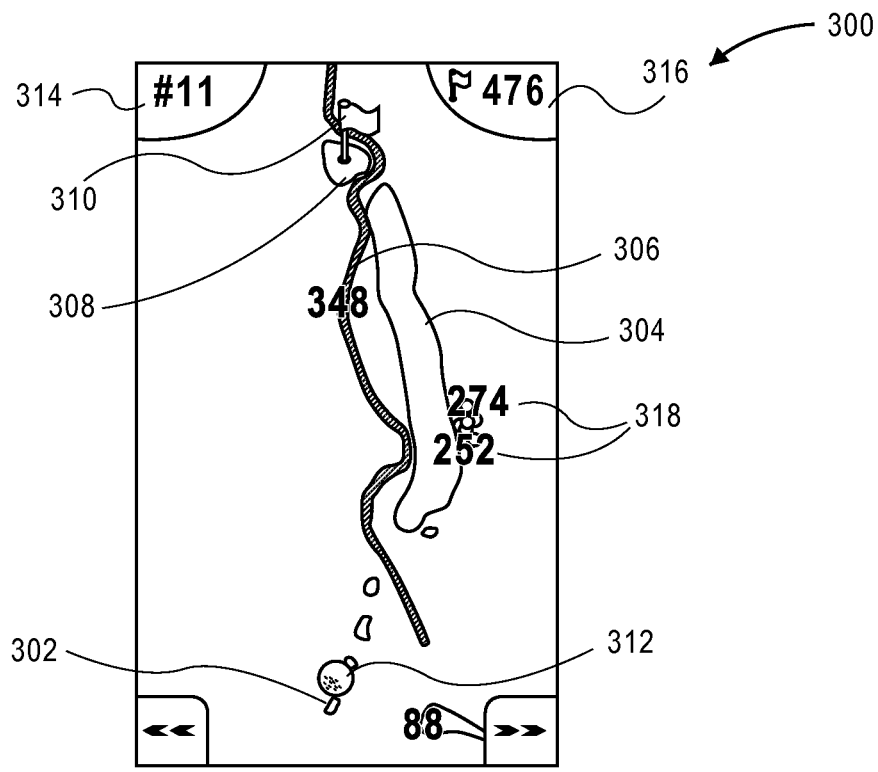
FIGS. 3A through 3F are illustrations depicting an example layout of a hole of a golf course provided by a display of the golf-related electronic device illustrated in FIG. 1, wherein functionality is provided to display the layout of the hole of the golf course in a "hole-up" orientation.

FIG. 3A depicts the layout 300 of the golf hole wherein the golfer 312 is shown as being located on the tee box 302. As illustrated, the green 308 and pin 310 are centered at the top of the layout 300 (e.g., at the top of the display 110) and the position of the golfer 312 is centered at the bottom of the layout 300 (e.g., at the bottom of the display 110). In FIG. 3A, the entire golf hole is displayed in the layout 300.

Figure 3B:
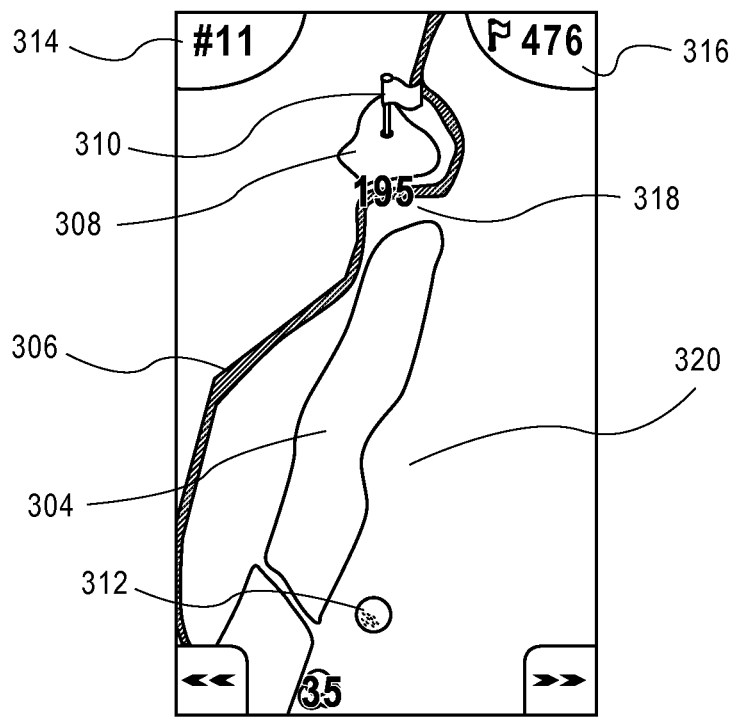

FIG. 3B depicts the layout 300 of the golf hole wherein the golfer 312 is shown as being located in the rough 320 to the right of the fairway 304. In FIG. 3B, the pin 310 remains centered near the top of the layout 300, while the position of the golfer 312 remains centered near the bottom of the layout 300 even though the position of the golfer has changed from the position (e.g., on the tee box 302) shown in FIG. 3A. However, other features of the golf course (e.g., the fairway 304, obstacles 306, the green 308, the rough 320, and so on) are reoriented and/or resized in relation to the pin 310 and the position of the golfer 312. Further, features of the golf hole, such as the tee box 302, that are behind the golfer (e.g., farther away from the pin 310 than the golfer 312) may no longer be displayed in the layout 300 in favor of enlarging the remaining features of the golf hole in the display 110.

Figure 3C:
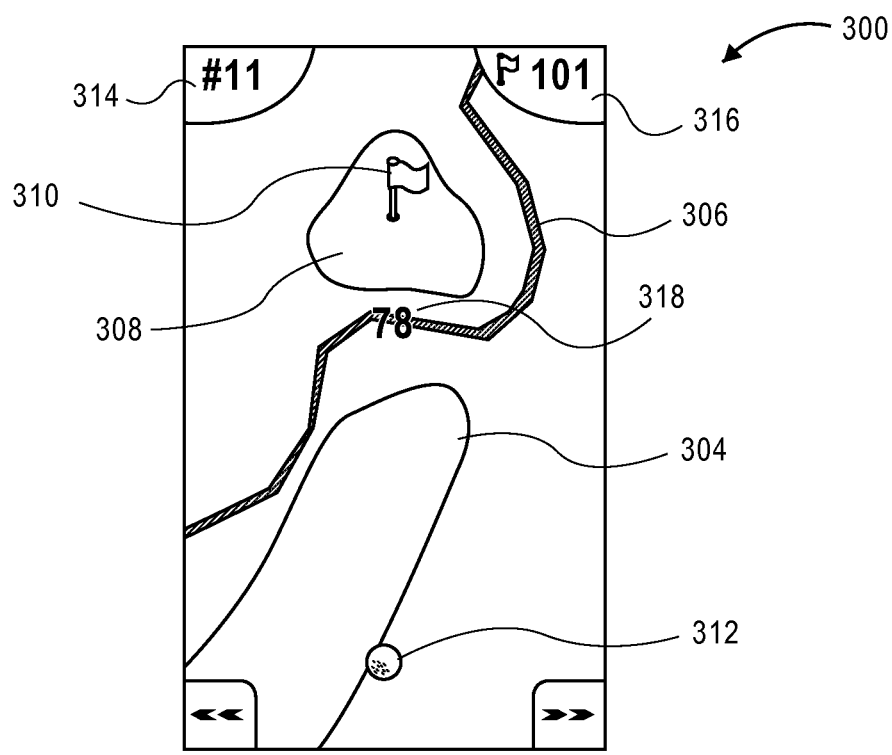

FIG. 3C depicts the layout 300 of the golf hole wherein the golfer 312 is shown as being located in the right portion of the fairway 304. Again, the green 308, the pin 310 and the position of the golfer 312 are presented at the same relative positions on the display 110 as in FIGS. 3A and 3B. The other features of the layout 300 of the golf course are again reoriented and/or resized in relation to the pin 310 and the position of the golfer 312. In particular, the green 308 is resized and rotated to remain proportionate to the other features of golf hole. As in FIG. 3B, features of the golf hole (e.g., the tee box 302, portions of the fairway 304, and so on) that are behind the golfer are no longer displayed in the layout 300.

Figure 3D:
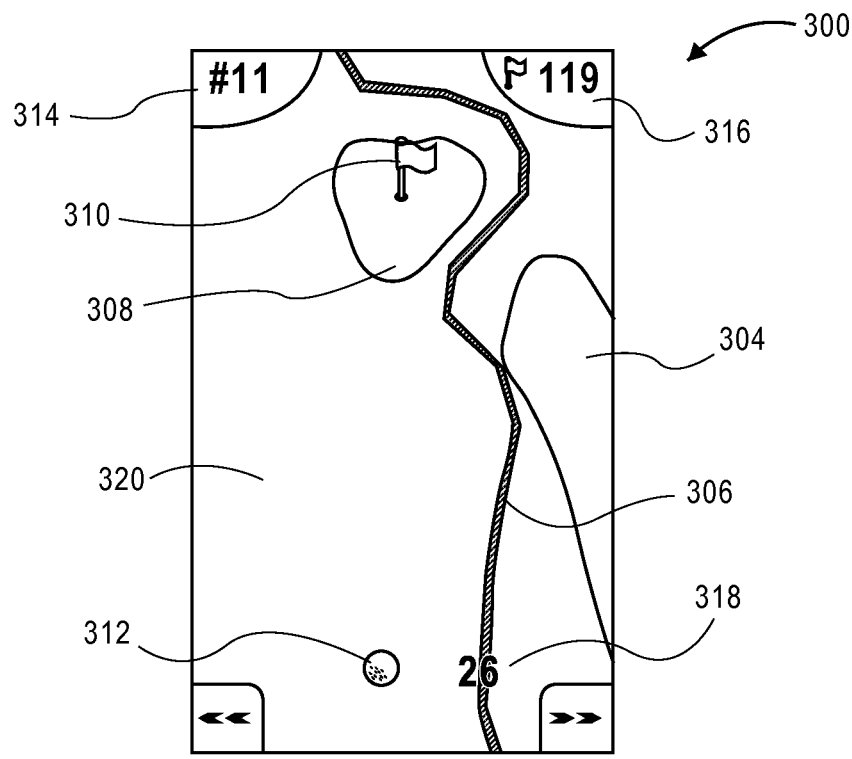
Figure 3E:
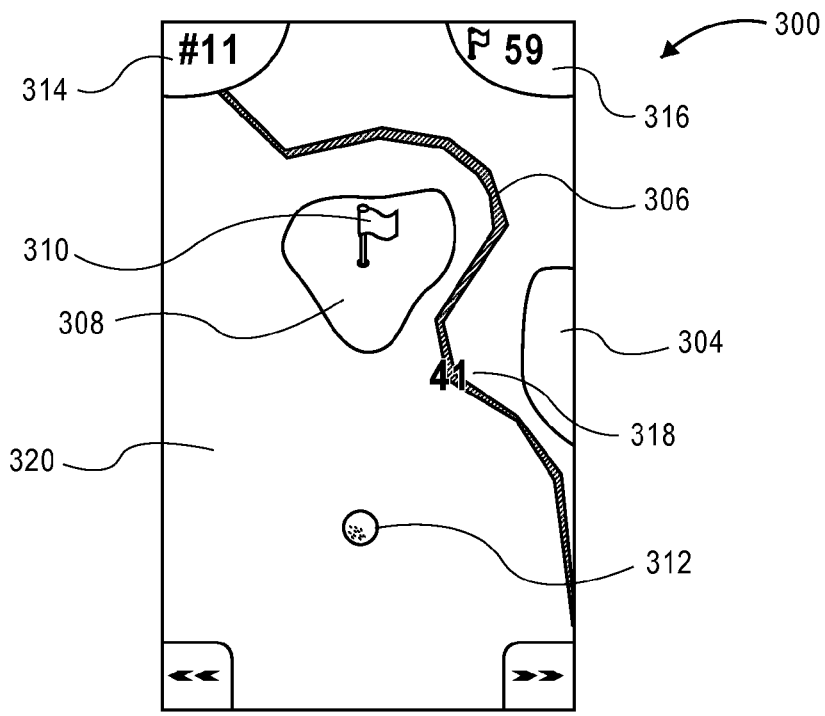

FIG. 3D shows the layout 300 of the golf hole wherein the golfer 312 is shown as being located in the rough 320 to the left of the fairway 304. FIG. 3E shows the layout 300 wherein the golfer 312 is shown as being on approach to the green 308. In FIGS. 3D and 3E, the pin 310 and the position of the golfer 312 are presented at the same relative locations as in FIGS. 3A, 3B, and 3C, even though the golfer has moved from the previous position illustrated in FIG. 3C. The other features of the layout 300 of the golf course such as the fairway 304, the green 308, the rough 320, and so on, are again reoriented and/or resized in relation the pin 310 and the position of the golfer 312, and features of the golf hole that are behind the golfer 312 are no longer displayed in the layout 300.

Figure 3F:
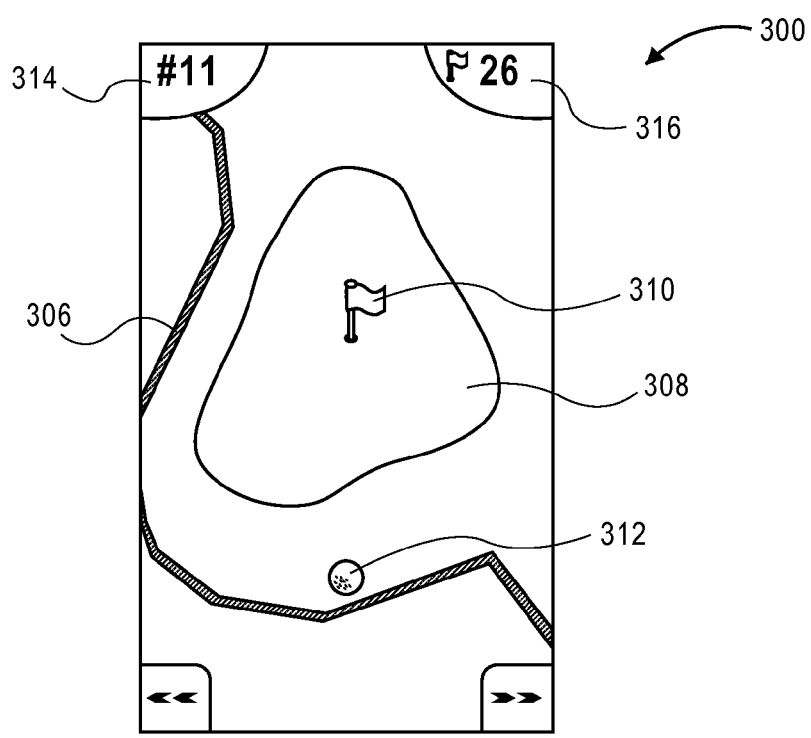

FIG. 3F shows the layout 300 of the golf hole wherein the golfer 312 is shown as being on the opposite side of the green 308 as the position of FIG. 3E. Again, the green 308, the pin 310, and the golfer 312 are displayed at the same relative positions in the display 110 as in FIGS. 3A through 3D despite the reversal in orientation of the layout 300. The green 308, while still centered at the top of the layout 300, is rotated and resized to reflect the new position of the golfer 312. Some features of the golf hole (e.g., the tee box 302, the fairway 304, and so on) that are beyond the green 308 in the direction of the tee box 302 might not be displayed in the layout 300. For example, sand traps beyond the green 308 may continue to be displayed while other features are not displayed to reduce visual clutter.

The above-described hole-up functionality may be automatically enabled and disabled by the device 102. In embodiments, the golfer may also selectively enable and disable such functionality, e.g., via the user interface 112.

Target Distance Functionality

With reference to FIGS. 4A through 4G, techniques are described to furnish target distance functionality to a golfer using the electronic device 102. As shown, the device 102 may present on the display 110 an indication of a golf hole layout 400 (golf hole layouts 400 for various holes of a golf course are shown) including the current position of the golfer 402, which may be the position of the electronic device 102, and the distance to the pin or green 404. Additionally, the device 102 may present a target icon 406 that may be manipulated by the golfer to calculate additional yardages (distances). For example, in embodiments where the display 110 comprises a touch screen, the golfer may simply touch the golf hole layout 400 to place, drag, shift, or otherwise move the target icon 406 to dynamically update displayed yardage(s). However, the target icon 406 may additionally or alternatively be manipulated using any inputs associated with the user interface 112. The golfer may then exit the layout 400 (e.g., by selecting the "Done" button 414).

Figure 4A:
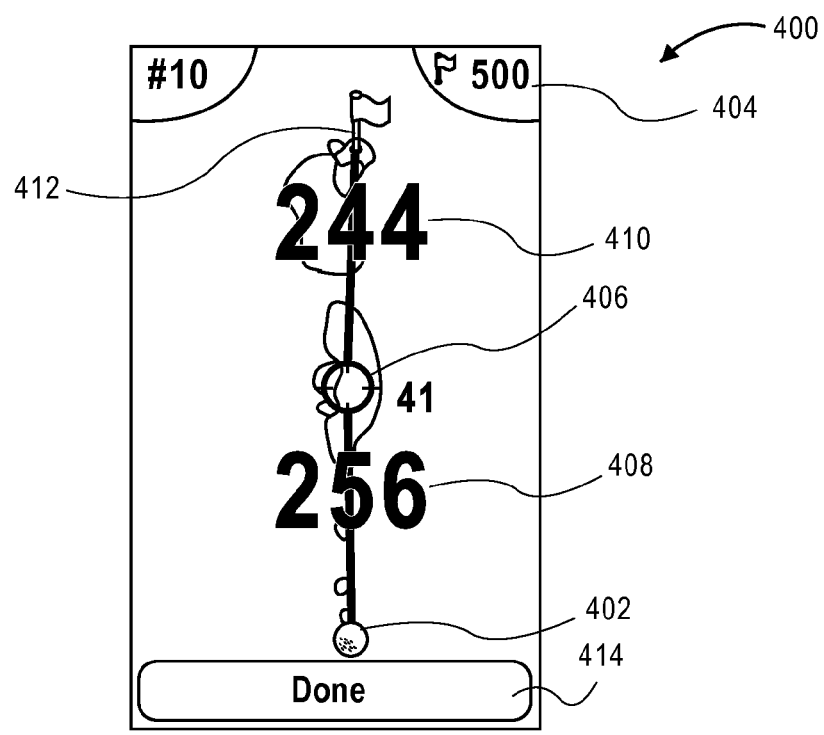
FIGS. 4A through 4G are illustrations depicting example layouts of holes of a golf course displayed by a display of the golf-related electronic device illustrated in FIG. 1, wherein target distance functionality is provided to a golfer using the golf-related electronic device.
Figure 4B:
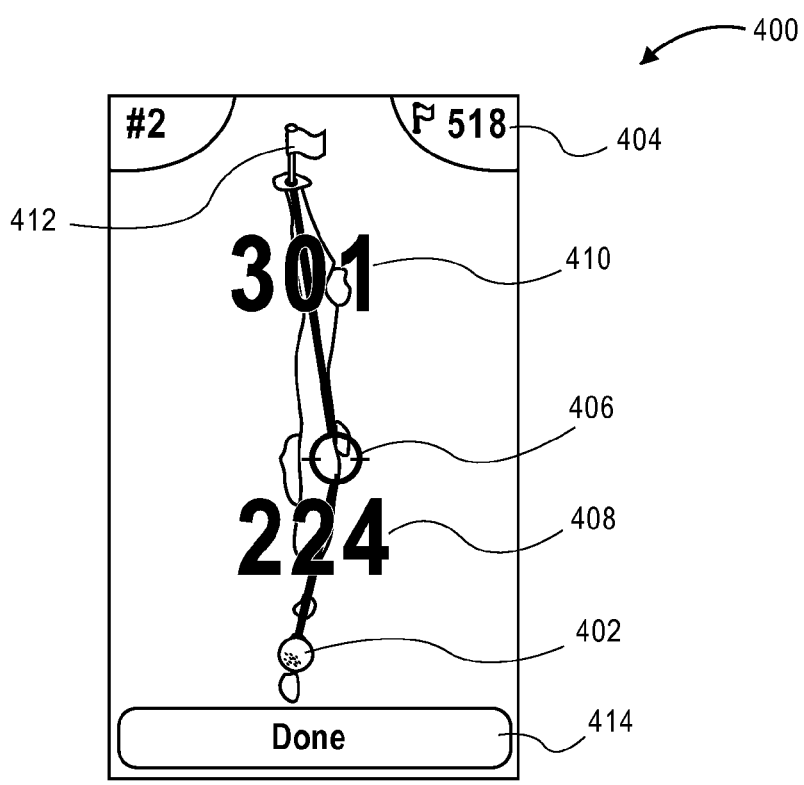
Figure 4C:
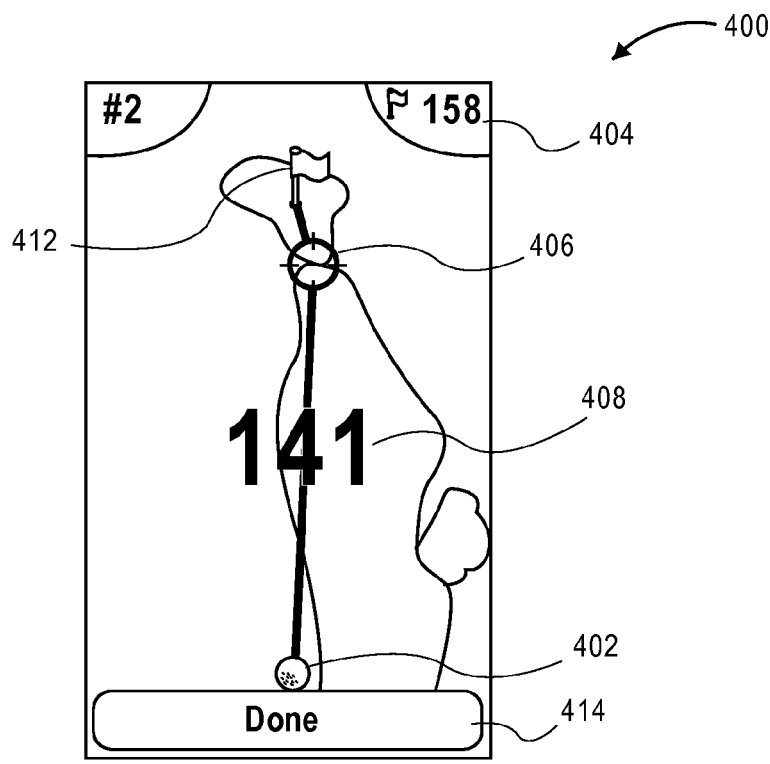
Figure 4D:
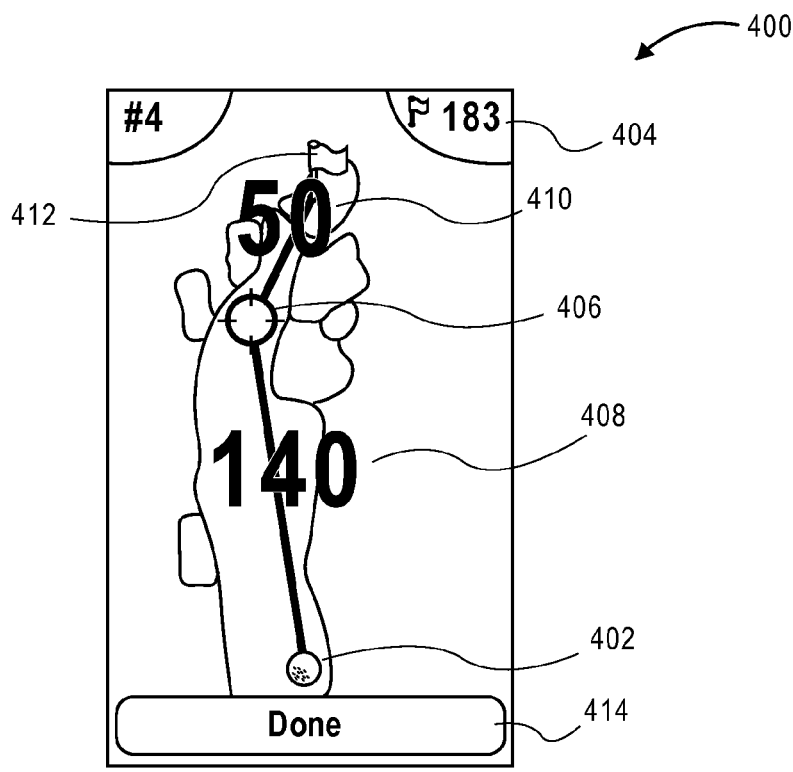
Figure 4E:
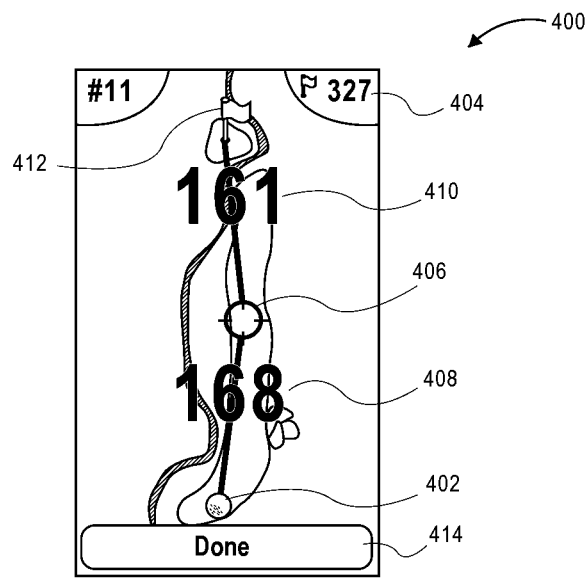
Figure 4F:
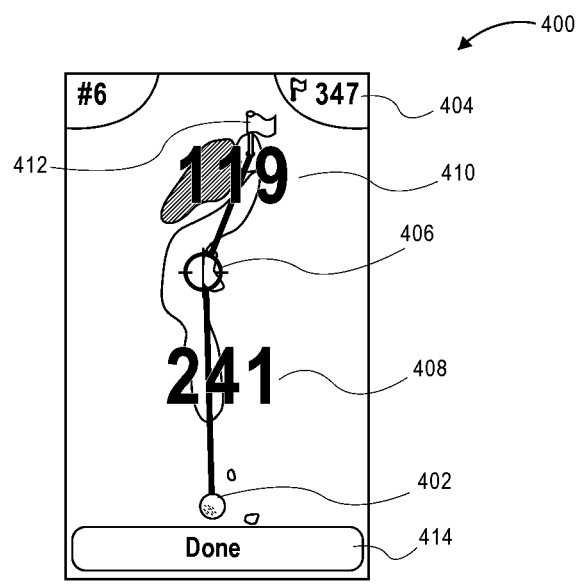

As the target icon 406 is moved about the layout 400, the device 102 may present various yardages corresponding to the geographical position associated with the target icon 406. For example, as shown in the FIGS. 4A through 4G, the device 102 may present the distance 404 from the golfer (device 102) to the pin, the distance 408 from the current position of the golfer 402 to the target icon 406, and the distance 410 from the target icon 406 to the pin (or other point on the green) 412. Where the target icon 406 is positioned sufficiently close to either the position of the golfer 402 or the pin 412 so that one distance 408 or 410 is small in comparison with the other distance 410 or 408, the corresponding smaller distance 408 or 410 may not displayed to avoid clutter. Such an instance is illustrated in FIG. 4C.

Figure 4G:
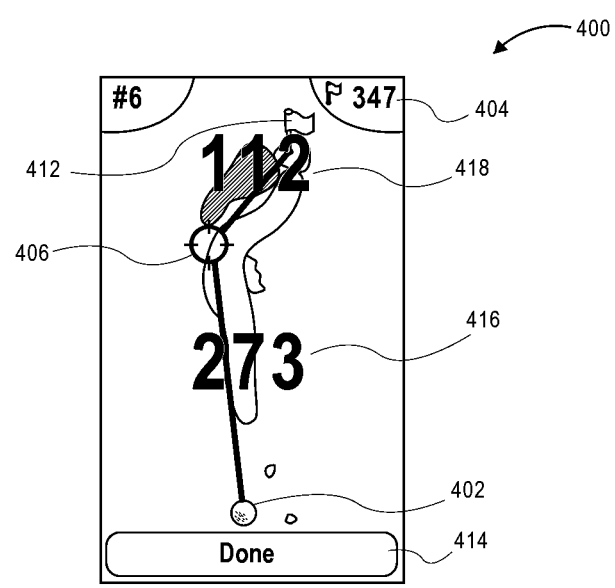

The target distance functionality provided by the device 102 enables the golfer to easily determine the distance to any point on the displayed golf hole and the distance from that point to the pin 412. For example, as shown in FIG. 4G, such functionality may be particularly beneficial on holes with dog-leg layouts, as the golfer may determine the distance 416 required for an approach shot and then the distance 418 required to reach the pin 412 after the approach shot. As the target icon 406 is moved about the golf hole layout 400, the distances displayed by the device 102 may be dynamically recalculated and updated to enable the golfer to rapidly determine a plurality of possible approach distances.

As discussed above, golf hole map data stored within the memory 108 may be vectorized to enable any portion of a golf hole to be displayed by the device 102 with accurate yardages. In this manner, any point on the golf hole layout 400 may be selected by the golfer to generate an accurate distance 408 to the target icon 406 and an accurate distance 410 from the target icon 406 to the pin 412. Consequently, the golfer is not required to select only a limited or finite number of pre-defined positions on the golf hole layout 400 to calculate pertinent yardages.

In some embodiments (e.g., wherein the display 110 includes a touch screen), the target icon 406 may be placed by the golfer simply by touching the display 110 without requiring the selection of menu inputs or other control features. Such one-touch functionality enables the golfer to rapidly determine distances with one hand while on the golf course without requiring complex interaction with the device 102. In other embodiments, the target icon functionality many be manually enabled by the golfer through the selection of menu inputs or other input via the user interface 112.

Feature Based Distance Display

Figure 5A:
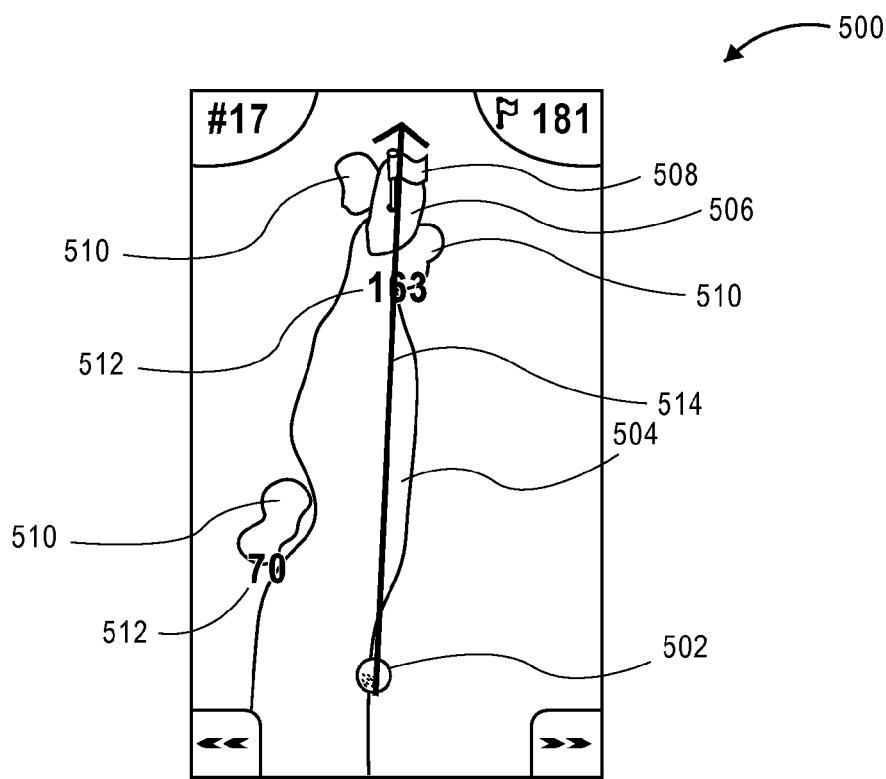
FIGS. 5A through 5H are illustrations depicting example layouts of holes of a golf course displayed by a display of the golf-related electronic device illustrated in FIG. 1, wherein functionality is provided to selectively label distances associated with features of golf holes.
Figure 5B:
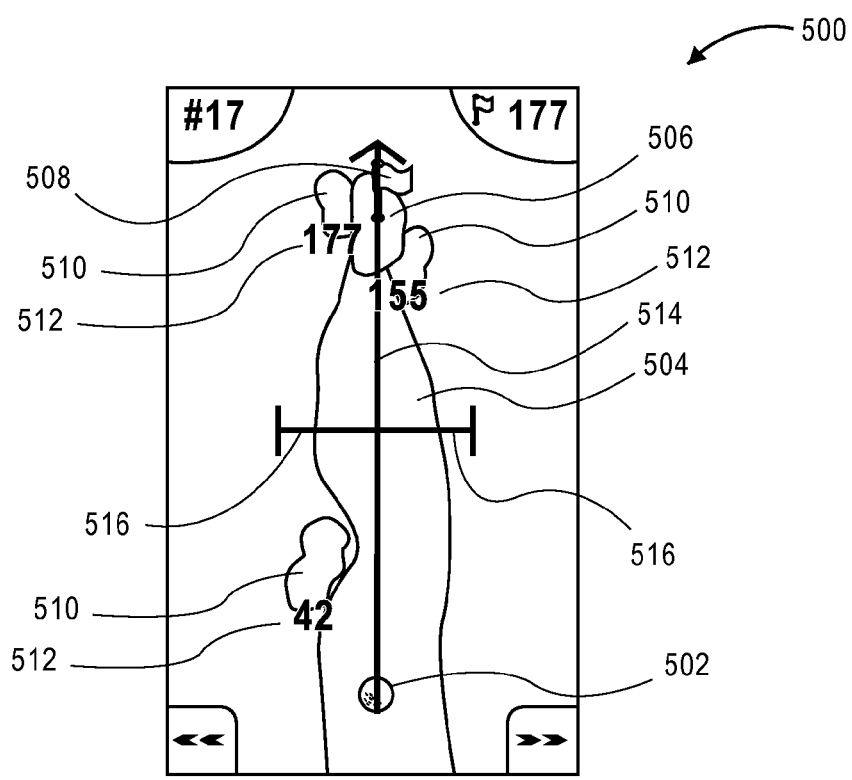
Figure 5C:
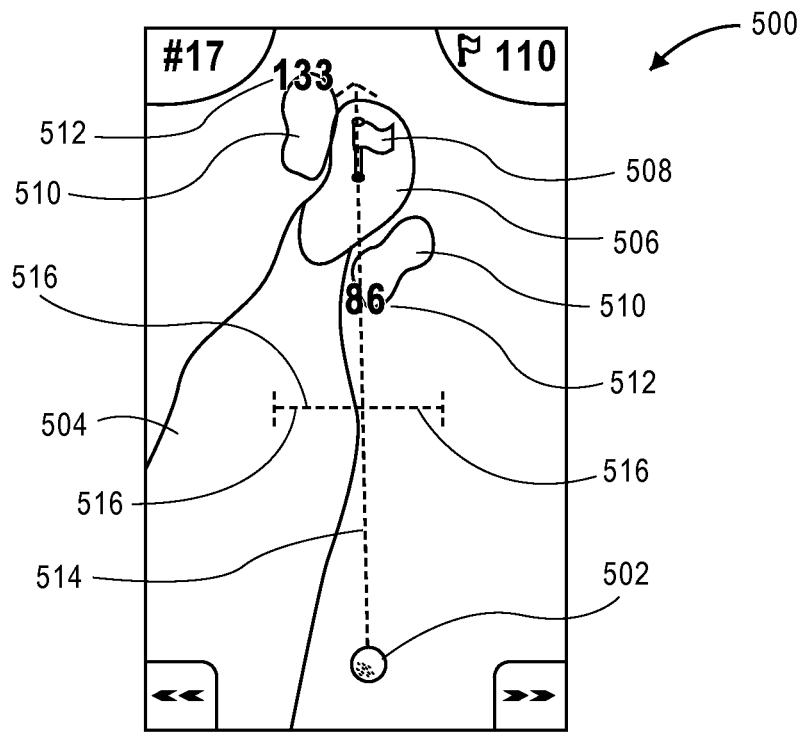

With reference to FIGS. 5A through 5H, techniques are described to selectively label distances associated with features of a hole of a golf course. As shown in FIGS. 5A through 5C, the electronic device 102 may present a layout 500 of the hole of the golf course on the display 110. The layout 500 is comprised of a map of the golf hole that includes indicia that represent the position of the golfer 502 (represented as a golf ball icon), the fairway 504, the green 506, and the pin 508 (represented as flag icon associated with the green 506). The layout 500 further includes indicia that represent the various features 510 of the golf hole such as sand traps, water hazards and other hazards, out of bounds areas, trees, tree lines, waste areas, man-made hazards such as cart paths, and so on.

In various embodiments, the device 102 may automatically determine the hole currently being played by the golfer 502 based on its current position and vectorized golf course map data stored within the memory 108. Distances 512 to features 510 of the golf hole may be labeled based on the relative positions of the golfer 502, which may be the position of the electronic device 102, the hole features 510, and a point on the hole such as the pin 508, another point on the green 506, a layup point on a dog-leg hole, and so on. Based on these relative positions, the device 102 may determine which features of the hole are most pertinent to the golfer's upcoming shot. Such functionality is particularly useful in combination with vectorized map data, where the device 102 is capable of displaying accurate distances to multiple points within the golf hole. The various distances displayed by the device 102 may be dynamically recalculated, relabeled, and updated "on the fly" to continuously provide the golfer 502 with relevant and accurate information.

As illustrated, the device 102 may generate a vector 514 extending from the current position of the device 102. In various embodiments, the vector 514 may extend from the current position of the device 102 and over one or more points 530 associated with the hole of the golf course (e.g., the pin 508, a point within the green 506, a layup point on a dog leg hole, and so on) and be employed by the device 102 to identify hole features that lie within a lateral range 516 of the vector 514. In some configurations, the vector 514 may extend over and past the green 506 associated with the current position of the device 102. In embodiments where a pin location is associated with the green 506, the vector 514 may extend over and past the pin location.

To accurately display distances to various features 510 of the golf hole associated with the current position of the device 102, the device 102 may access vectorized golf course map data to acquire hole data for the hole currently being played by the golfer 502 and identify a plurality of points 530 associated with one or more of the features 510 of the hole. For example, in some configurations, the vectorized map data may be utilized by the device 102 to identify hundreds, or even thousands, of points on each golf hole, where each point corresponds to a geographic location. The various features 510 associated with each hole may therefore be represented by many points to enable accurate distances to be determined to any part of the feature 510. As discussed below, the vector 514 may be utilized to determine which of the points 530 or combination of points 530 should be used by the device 102 to determine and display various distances from the current geographic location of the device 102.

The distance 512 between the current position of the golfer 502 (e.g., the current position of the device 102) and the particular feature 510 of a hole may be displayed by the display 110 when the feature 510, and/or one or more points 530 associated with the feature 510, is located within the lateral range 516 of the vector 514. Conversely, features 510 of the hole of the golf course that are located beyond the lateral range 516 of the vector 514 may be disregarded so that these distances are not displayed, thereby reducing display clutter.

In one or more embodiments, the lateral range 516 may be a predetermined, fixed distance, such as 10 yards, from the vector 514 measured from either side of the vector 514 normal to the vector 514. Additionally or alternatively, the lateral range 516 may be dynamic. For example, the lateral range 516 may be selected based on the distance between golfer 502 (e.g., the position of the device 102) and the point within the hole through which the vector 514 extends (e.g., the pin 508). The lateral range 516 may be greater the farther the golfer 502 is from the pin 508 to account for the probable decreased accuracy of longer shots. Thus, the lateral range 516 may, for example, be 10 yards at a distance of 100 yards from the from the pin 508, 20 yards at a distance of 200 yards from the pin 508, 30 yards at a distance of 300 yards from the pin 508, and so on. Other lateral ranges/distance combinations and distributions are contemplated.

In embodiments, when a feature 510 of the hole spans more than one portion of the lateral range 516 from the vector 514, the device 102 may select the point 530 of the feature 510 closest to the vector 514 and/or closest to the device 102. The identified features 510 of the hole may then be labeled with the corresponding appropriate distance 512 from the golfer 502. As shown in FIG. 5A, the vector 514 and/or lateral range 516 may be invisible and not displayed by the display 110 to the golfer, or, as shown in FIG. 5B, may be presented on the display 110 for manipulation and/or viewing by the golfer. Further, as the golfer moves about the hole, the golf hole layout 500 may be automatically scaled to update the relevant hole features 510 and associated distances 512 as shown in FIG. 5C.

Figure 5D:
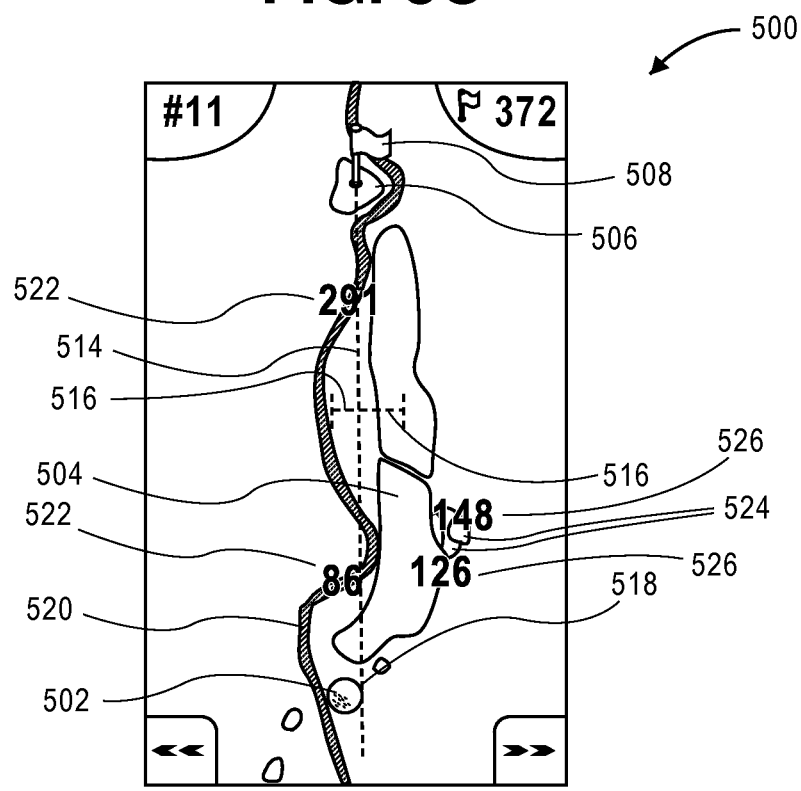

Example feature-based distance display functionality is further illustrated in FIGS. 5D through 5H. FIG. 5D depicts the layout 500 of a golf hole wherein the golfer 502 is shown as being located on the tee box 518 of the hole. As illustrated, the layout 500 includes a depiction of a water hazard 520 lining the left side of the fairway 504 of the golf hole. Distances 522 to the water hazard 520 are shown for points along the water hazard 520 within a predetermined lateral range 516 of a vector 514 extending between the golfer 502 and the pin 508 as described above, but not at other positions along the hazard 520 which fall outside of the lateral range 516. As a result, distances to features of the golf hole are not displayed where those features are determined to be unlikely to be pertinent to the golfer's next shot using the techniques described herein.

The layout 500 illustrated in FIG. 5D is configured to further display distances 524 to features 526 (e.g., the sand traps on the right of the fairway 504) that are located within a predetermined distance from the golfer 502 (e.g., the current position of the device 102), such as within 150 yards of the golfer 502, and so on. These distances 524 may be presented even though the features 526 to which they pertain fall outside of the lateral range 516 of the vector 514 since the features 526, by virtue of their nearness, are deemed to be pertinent to the golfer.

Figure 5E:
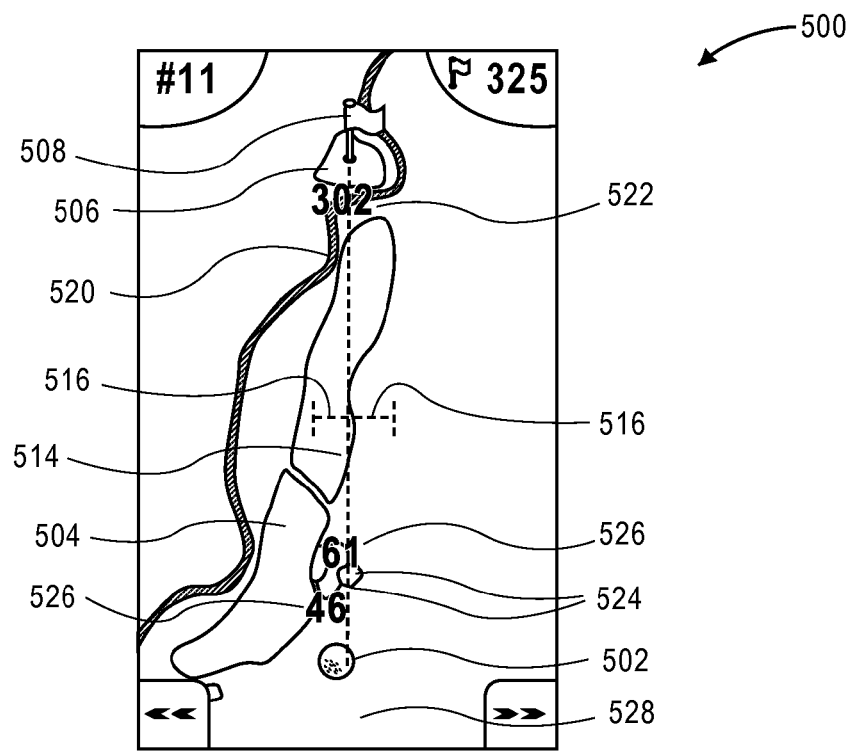

FIG. 5E depicts the layout 500 of the golf hole wherein the golfer 502 is located in the rough 528 to the right of the fairway 504. Distances to the water hazard 520 lining the left side of the fairway 504 are not shown within the layout 500 since this portion of the water hazard 520 is determined to not lie within a predetermined lateral range 516 of the vector 514 extending between the golfer 502 and the pin 508. However, a distance 522 to a second portion of the water hazard 520 that passes in front of the green 506 is shown since the water hazard 520 does lie within the lateral range 516 of the vector 514 in this area of the golf hole.

Figure 5F:
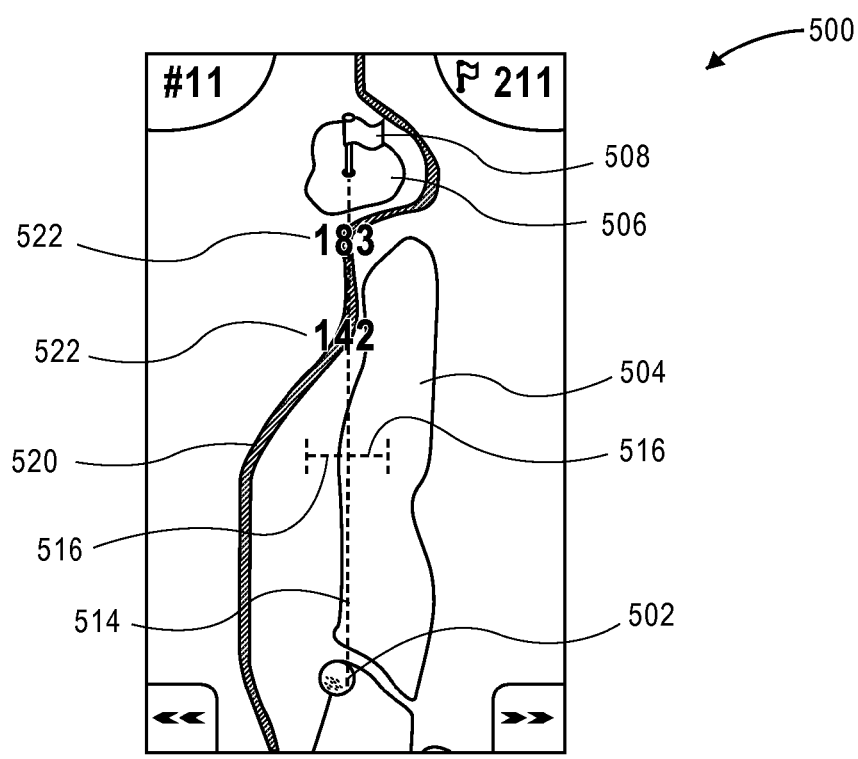

FIG. 5F depicts the layout 500 of the golf hole wherein the golfer 502 is located on the left portion of the fairway 504. In the layout 500 shown, distances 522 to the water hazard 520 in front of the green 506 are shown since the water hazard 520 does lie within the lateral range 516 of the vector 514 at these points. However, other hazard-related distances such as distances to the water hazard 520 along the left side of the fairway 504 are not shown within the layout 500 since these hazards do not lie within the predetermined lateral range 516 to the vector 514.

Figure 5G:
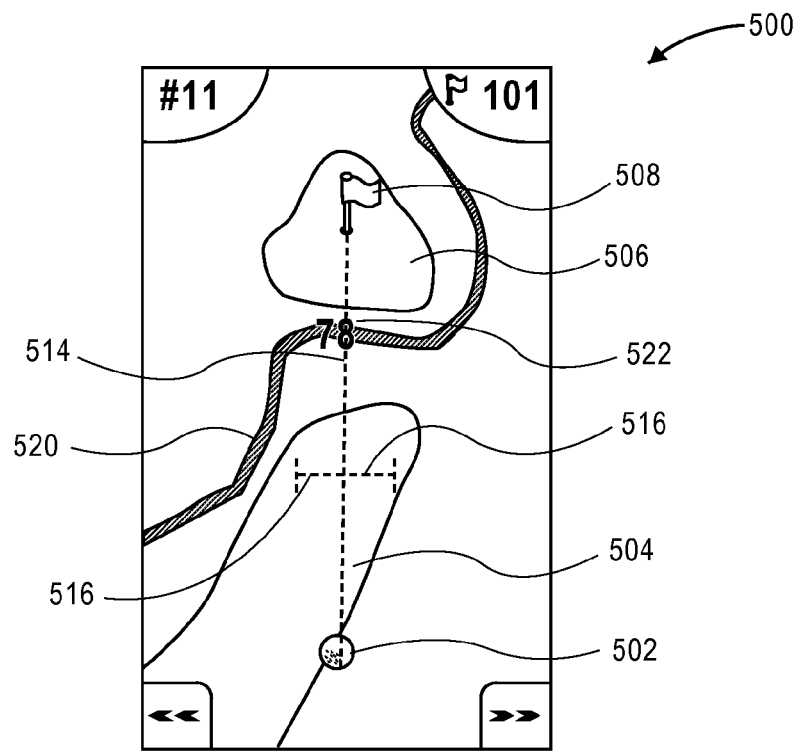

FIG. 5G depicts the layout 500 of the golf hole wherein the golfer 502 is shown following an approach shot in front of the green 506. In the layout 500 shown, the distance 522 to the water hazard 520 in front of the green 506 is provided since at this point the water hazard 520 lies on the vector 514 and is thus within the lateral range 516 of the vector 514 that extends between the golfer 502 and the pin 508. Moreover, the distance 522 to the water hazard 520 presented is the distance to a point of the water hazard 520 that is closest to the vector 514. Distances to other points along the water hazard 520 that lie within the lateral range 516 of the vector 514 are not presented to reduce display clutter. Further, distances to the water hazard 520 along the left side of the fairway 504 and the right side of the green 506 are not shown within the layout since these hazards do not lie within the lateral range 516.

Figure 5H:
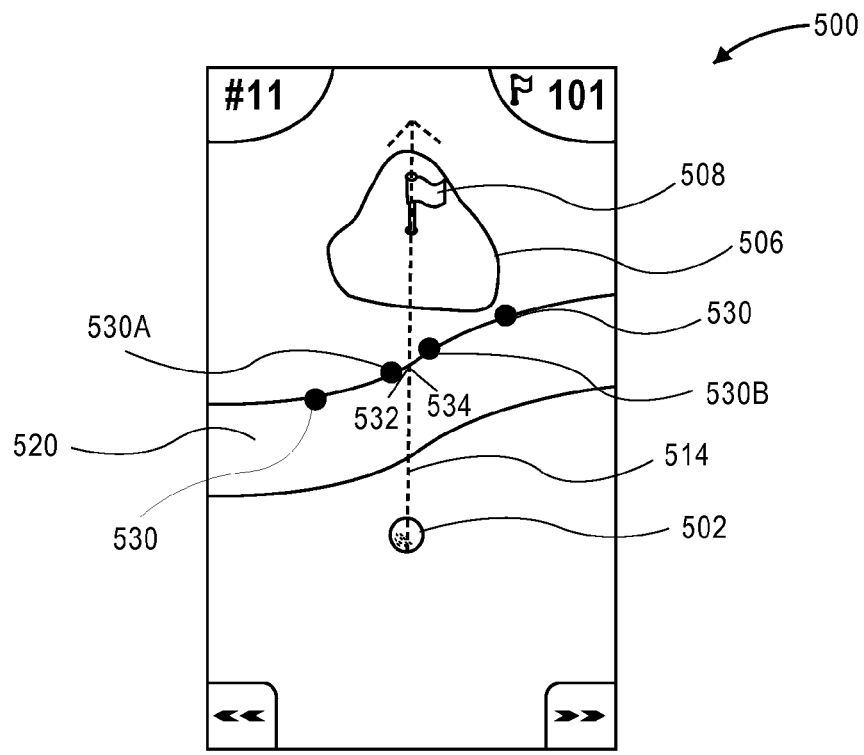

FIG. 5H presents a variation of the layout 500 of FIG. 5G. In the configuration of FIG. 5H, the vector 514 does not directly pass over one or more points 530 associated with the water hazard 520. Instead, the vector 514, extending from the current position of the device 102 and over the pin 508, passes between two points 530a, 530b associated with the water hazard 520. To provide an accurate distance to carry the hazard 520, the device 102 identifies a line segment 532 extending between the two points 530a, 530b and then determines an intersection 534 of the line segment 532 and the vector 514. A distance between the current position of the device 102 and the intersection 534 may then be determined for presentation on the display 110. Such a configuration enables an accurate distance to be determined to any location on the hole even where the vectorized golf course map data does not include point(s) 530 that exactly correspond to the vector 514 extending from the current position of the device 102. Further, in some configurations, this process may be applied to identify distances to features that do not intersect the vector 514. For example, for a feature that falls within the lateral range 516 of the vector 514 but not on the vector 514 itself, the device 102 may identify a distance to a point associated with the feature by identifying a distance to an intersection of the lateral range 516 and a line segment extending between two points of the feature.

In embodiments where "hole up" functionality is employed, the vector 514 may extend from the current position of the device 102 and over the pin 508 such that the vector 514 is perfectly vertical as presented on the display 110. In other embodiments, the vector 514 may extend in any direction and is not necessarily vertically displayed.

Thus, although the electronic device 102 may be capable of displaying distances to any feature or feature portion on the hole due to the use of vectorized maps, the above-described functionality may be implemented by the device 102 to limit display clutter while still automatically presenting distances to the most relevant hole features, or to the most relevant points of the hole features. As the golfer moves about and over the hole, the device 102 may continuously update which features are pertinent and display distances associated with those identified features.

Pin Placement Functionality

Figure 6A:
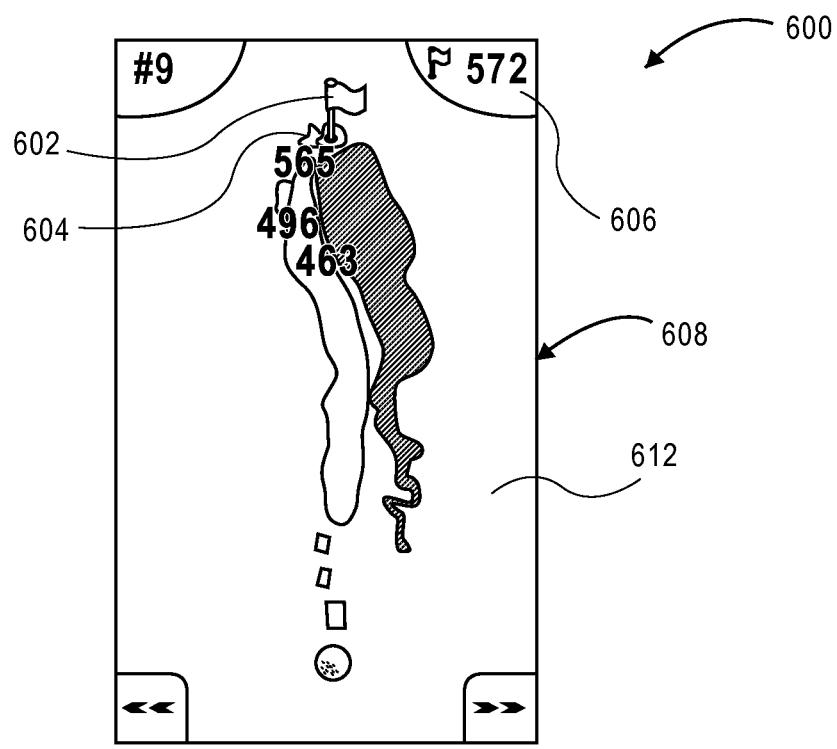
FIGS. 6A through 6D are illustrations depicting an example layout of a hole of a golf course displayed by a display of the golf-related electronic device illustrated in FIG. 1, wherein functionality is provided to furnish an interface to allow a golfer to graphically position a virtual pin marker on a displayed green of the hole.

With reference to FIGS. 6A through 6D, techniques are described to provide an interface 600 that allows the golfer to graphically place a virtual pin marker 602 on a displayed green 604. FIG. 6A illustrates an icon 606 that may be used to activate the pin placement functionality from another screen (e.g., a golf hole layout screen 608) displayed by the electronic device 102. However, the pin placement functionality may be activated in any manner including automatic activation where the golfer simply touches the representation of the green 604 on the display 110 or any other interaction with the user interface 112.

Figure 6B:
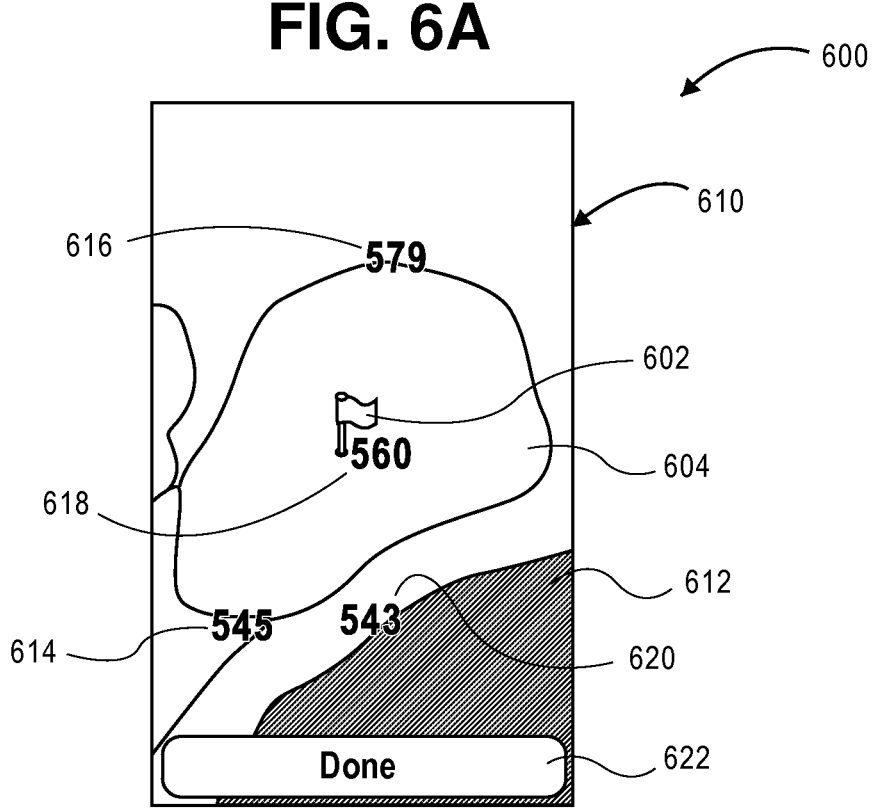
Figure 6C:
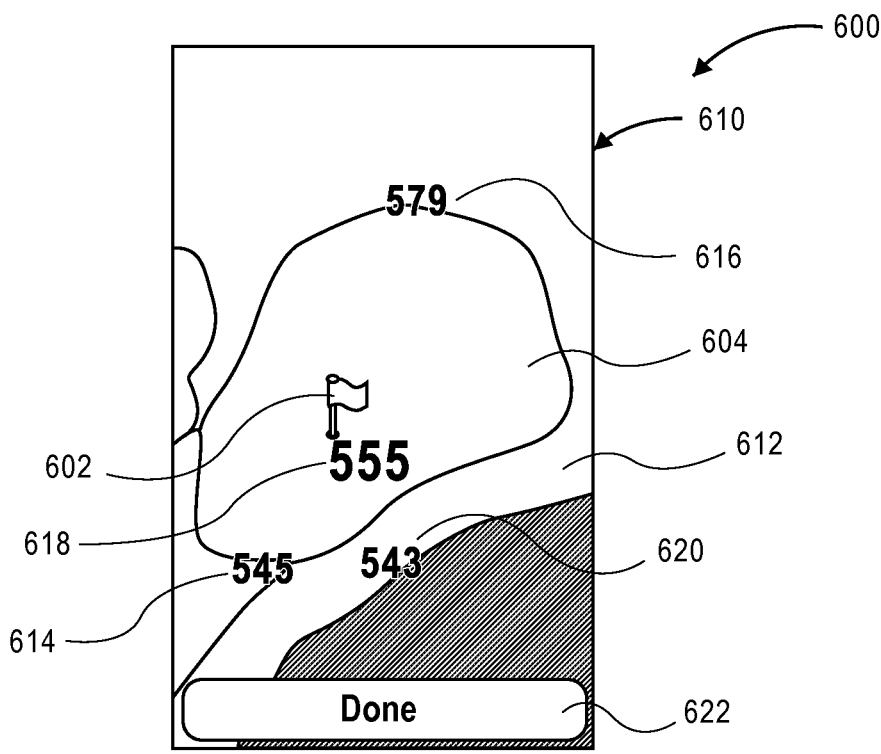
Figure 6D:
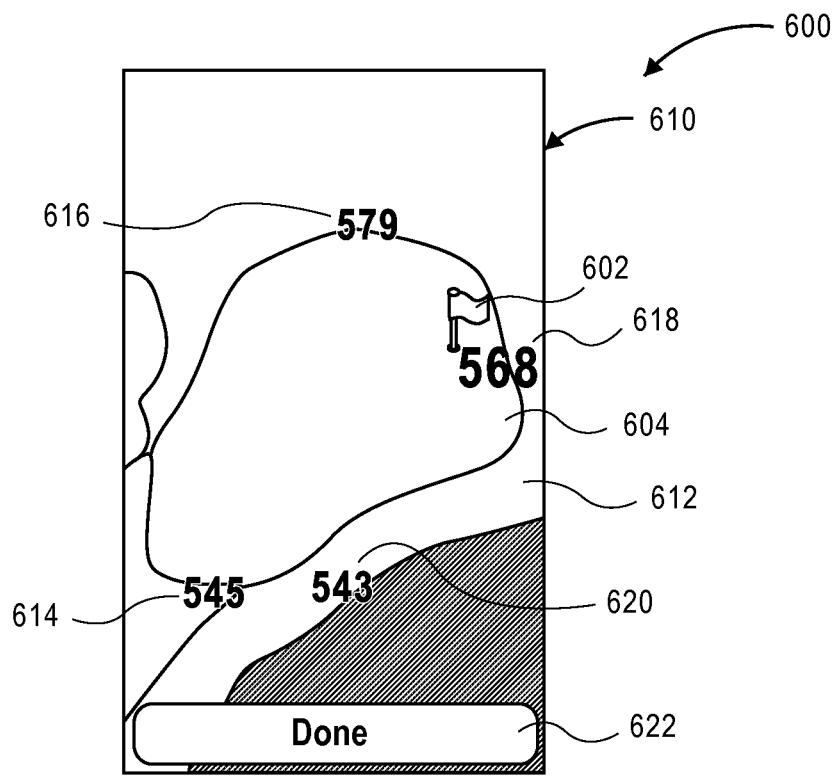

FIGS. 6B through 6D illustrate example pin placement screens 610 employed by the interface 600. In embodiments, the pin placement screens 610 may display distances for various features associated with, and located around, the green 604 of the golf hole layout 612 currently being displayed by the device 102. For example, pin placement screens 610 may display the distance 614 to the front-most portion of the green 604, the distance 616 to the rear-most portion of the green 604, the distance 618 to the virtual pin marker 602 as currently positioned on the green 604, and the distance 620 to various hole features (e.g., sand traps, water hazards, and so forth) positioned around the green 604.

The golfer may implement the user interface 112 to change the position of the virtual pin marker 602 to cause a distance to the pin to be calculated for any position of the virtual pin marker 602 on the green 604. For example, in embodiments employing a touch screen, the golfer may simply touch the display 110 to drag the virtual pin marker 602 to any desired location on the green 604. However, in other embodiments, the virtual pin marker 602 may be placed using inputs received via the user interface 112.

Once the golfer has set the virtual pin marker 602 to a desired location, the golfer may use the user interface 112 to exit from the pin placement screen (e.g., by selecting the "Done" button 622 displayed by the pin placement screen 610). Upon return, the relevant distances shown on the golf hole layout screen 608 are updated to reflect distances to the virtual pin location selected by the golfer. Thus, the electronic device 102 may accurately calculate distances using any pin location selected by the golfer, even when the pin location selected by the golfer does not correspond to the actual physical location of the pin on the green.

Generally, any of the functionality described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processors of the computing device 104 of FIG. 1. The program code can be stored in one or more computer readable media, an example of which is the memory 108 of the electronic device 102 of FIG. 1, or another device.

In embodiments where pin placement functionality is used in combination with the feature-based distance display functionality discussed above, movement of the virtual pin marker 602 enables the user to effectively adjust the vector 514 and lateral range 516, thereby ensuring that the device 102 displays relevant and accurate distances to features between the user and the location identified by the virtual pin marker 602.

For example, distances to important hole features (sand traps, etc.) may significantly vary depending on where the user is aiming on the green 604. Further, in embodiments where a plurality of points are utilized to define the boundaries of the green 604, placement of the virtual pin marker 602 may be limited to the bounded area to ensure that the user does not inadvertently place the pin marker 602 in a location not associated with the green 604.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining a current position of a device;
   accessing vectorized golf course map data to identify a plurality of points associated with a feature of a golf hole represented by the vectorized golf course map data, where the feature is selected from the group consisting of a sand trap and a water hazard;
   determining when one or more of the identified points is within a lateral range of a vector extending from the current position of the device to a point associated with the golf hole corresponding to a desired geographic location on the golf hole; and
   causing the distance between the current position of the device and the one or more identified points within the lateral range to be displayed by a display of the device when the one or more identified points of any feature of the golf hole is determined to be within the lateral range;
   wherein the plurality of points associated with the feature are geographic locations to be avoided on the golf hole; and
   wherein an accurate distance may be determined to any identified point associated with the feature.

2. The method as recited in claim 1, further comprising disregarding an additional feature of the hole when points associated with the additional feature are located beyond the lateral range of the vector extending from the current position of the device.

3. The method as recited in claim 1, wherein the current position of the device is determined using a global positioning system receiver.

4. The method as recited in claim 1, wherein the hole of the golf course comprises a green and the vector extends over and past the green.

5. The method as recited in claim 4, wherein the vector extends over a pin location on the green.

6. The method as recited in claim 1, wherein the distance between the current position of the device and the one or more identified points is displayed on a map of the golf hole.

7. The method as recited in claim 1, wherein the feature comprises one or more of a sand trap, a water hazard, an out of bounds area, a tree, a tree line, a cart path, a waste area, or a man-made hazard.

8. The method as recited in claim 1, wherein the lateral range is a fixed distance measured from the vector.

9. The method as recited in claim 8, wherein the lateral range is 10 yards.

10. The method as recited in claim 1, further comprising calculating the distance from the current position of the device to the point associated with the golf hole through which the vector extends, wherein the lateral range is determined dynamically based on the calculated distance.

11. The method as recited in claim 10, wherein the lateral range decreases as the calculated distance decreases.

12. The method as recited in claim 1, further comprising causing the golf hole to be displayed in a hole-up orientation by the display.

13. The method as recited in claim 1, wherein the vector extends over a layup point on a dog leg hole.

14. A method comprising:
    determining a current position of a device;
    identifying a hole of a golf course corresponding to the current position of the device;
    accessing vectorized golf course map data to acquire hole data for the identified hole;
    identifying a plurality of points associated with a feature of the identified hole using the acquired hole data, where the feature is selected from the group consisting of a sand trap and a water hazard;
    identifying a line segment extending between two of the points;
    identifying an intersection of the line segment and a vector extending from the current position of the device to a point associated with the golf hole corresponding to a desired geographic location on the golf hole;
    determining a distance between the current position of the device and the intersection; and
    displaying the distance on a map of the identified hole presented by the device;
    wherein the plurality of points associated with the feature are geographic locations to be avoided on the golf hole; and
    wherein an accurate distance may be determined to any identified point associated with the feature.

15. The method as recited in claim 14, wherein the current position of the device is determined using a global positioning system receiver.

16. The method as recited in claim 14, wherein the hole of the golf course comprises a green and the vector extends over and past the green.

17. The method as recited in claim 16, wherein the vector extends over a pin location on the green.

18. The method as recited in claim 14, wherein the feature comprises one or more of a sand trap, a water hazard, an out of bounds area, a tree, a tree line, a cart path, a waste area, or a man-made hazard.

19. The method as recited in claim 14, wherein the map is displayed in a hole-up orientation.

20. The method as recited in claim 14, wherein the vector extends over a layup point on a dog leg hole.

21. A device comprising:
    a location determining component operable to receive satellite navigation signals and determine a current position of the device using the received satellite navigation signals;
    a display operable to display information;
    a memory operable to store a module and vectorized golf course map data; and
    a computing device operable to execute the module to—
    identify a hole of a golf course corresponding to the current position of the device;
    access the vectorized golf course map data to acquire hole data for the identified hole;
    identify a plurality of points associated with a feature of the identified hole using the acquired hole data, where the feature is selected from the group consisting of a sand trap and a water hazard;
    based on the acquired hole data, determine when one or more of the identified points is within a lateral range of a vector extending from the current position of the device to a point associated with the golf hole corresponding to a desired geographic location on the golf hole; and cause the distance between the current position of the device and the one or more identified points within the lateral range to be furnished on a layout of the hole displayed by the display when the one or more identified points of any feature of the golf hole is determined to be within the lateral range;

wherein the plurality of points associated with the feature are geographic locations to be avoided on the golf hole; and wherein an accurate distance may be determined to any identified point associated with the feature.

22. The device as recited in claim 21, wherein the module is further configured to disregard an additional feature of the hole when points associated with the additional feature are located beyond the lateral range of the vector extending from the current position of the device.

23. The device as recited in claim 21, wherein the hole of the golf course comprises a green and the vector extends over and past the green.

24. The device as recited in claim 23, wherein the vector extends over a pin located on the green.

25. The device as recited in claim 21, wherein the distance between the current position of the device and the one or more identified points is displayed on a map of the golf hole.

26. The device as recited in claim 21, wherein the feature comprises one or more of a sand trap, a water hazard, an out of bounds area, a tree, a tree line, a cart path, a waste area, or a man-made hazard.

27. The device as recited in claim 21, wherein the lateral range is a fixed distance measured from the vector.

28. The device as recited in claim 27, wherein the lateral range is 10 yards.

29. The device as recited in claim 21, wherein the module is further configured to calculate the distance from the current position of the device to the point associated with the golf hole through which the vector extends and determine the lateral range dynamically based on the calculated distance.

30. The device as recited in claim 29, wherein the lateral range decreases as the calculated distance decreases.

31. The device as recited in claim 21, wherein the hole is displayed in a hole-up orientation.

32. The device as recited in claim 21, wherein the vector extends over a layup point on a dog leg hole.

33. A device comprising:
a location determining component operable to receive satellite navigation signals and determine a current position of the device using the received satellite navigation signals;
a display operable to display information;
a memory operable to store a module and vectorized golf course map data; and
a computing device operable to execute the module to—
identify a hole of a golf course corresponding to the current position of the device;
access the vectorized golf course map data to acquire hole data for the identified hole;
identify a plurality of points associated with a feature of the identified hole using the acquired hole data, where the feature is selected from the group consisting of a sand trap and a water hazard;
identify a line segment extending between two of the points;
identify an intersection of the line segment and a vector extending from the current position of the device to a point associated with the golf hole corresponding to a desired geographic location on the golf hole; and
determine a distance between the current position of the device and the intersection, the distance being furnished on a layout of the hole displayed by the display;
wherein the plurality of points associated with the feature are geographic locations to be avoided on the golf hole; and
wherein an accurate distance may be determined to any identified point associated with the feature.

34. The device as recited in claim 33, wherein the hole of the golf course comprises a green and the vector extends over and past the green.

35. The device as recited in claim 34, wherein the vector extends over a pin location on the green.

36. The device as recited in claim 33, wherein the distance between the current position of the device and the intersection is displayed on a map of the golf hole.

37. The device as recited in claim 33, wherein the feature comprises one or more of a sand trap, a water hazard, an out of bounds area, a tree, a tree line, a cart path, a waste area, or a man-made hazard.

38. The device as recited in claim 33, wherein the hole is displayed in a hole-up orientation.

39. The device as recited in claim 33, wherein the vector extends over a layup point on a dog leg hole.

* * * * *